United States Patent
Fox et al.

(10) Patent No.: US 6,652,638 B2
(45) Date of Patent: Nov. 25, 2003

(54) UV-SENSITIVE MARKING COMPOSITION

(75) Inventors: Neil S. Fox, Carson City, NV (US); Christopher P. Finke, Reno, NV (US)

(73) Assignee: Aervoe Pacific Company, Inc., Gardnerville, NV (US)

( * ) Notice: Subject to any disclaimer, the term of this patent is extended or adjusted under 35 U.S.C. 154(b) by 223 days.

(21) Appl. No.: 09/873,027

(22) Filed: Jun. 1, 2001

(65) Prior Publication Data

US 2002/0178970 A1 Dec. 5, 2002

(51) Int. Cl.$^7$ .................... C09D 11/00; C03C 17/00
(52) U.S. Cl. ................ 106/31.64; 106/31.75; 106/31.77; 106/31.86; 106/31.69; 106/31.88; 523/160; 523/161
(58) Field of Search .............. 106/31.64, 31.75, 106/31.77, 31.86, 31.69, 31.88; 523/160, 161; 524/556, 577, 589, 588

(56) References Cited

U.S. PATENT DOCUMENTS

| | | | | |
|---|---|---|---|---|
| 3,904,562 A | * | 9/1975 | Hopfenberg et al. | 523/200 |
| 3,975,554 A | * | 8/1976 | Kummins et al. | 427/8 |
| 4,125,507 A | * | 11/1978 | Kummins et al. | 523/455 |
| 4,416,699 A | * | 11/1983 | Jacobson | 106/443 |
| 4,572,831 A | * | 2/1986 | Rosen | 106/31.03 |
| 4,598,020 A | * | 7/1986 | Panush | 428/411.1 |
| 4,610,806 A | * | 9/1986 | Rosen | 252/301.16 |
| 4,666,817 A | * | 5/1987 | Sachi | 430/160 |
| 5,413,839 A | * | 5/1995 | Chatwin et al. | 428/195 |
| 5,438,928 A | * | 8/1995 | Chatwin et al. | 101/369 |

* cited by examiner

*Primary Examiner*—Mark L. Bell
*Assistant Examiner*—Veronica F. Faison
(74) *Attorney, Agent, or Firm*—Jones, Waldo, Holbrook & McDonough; Brent T. Winder

(57) ABSTRACT

A marking composition for placing a temporarily visible mark on a surface. The composition includes a paint base and a pigmented colorant. The pigmented colorant is dispersed within the paint base, and has characteristics that cause the mark to progressively become substantially invisible upon exposure to UV light. Additives, such as UV absorbers and anti-oxidants may be included to alter the rate at which the mark becomes invisible. The pigmented colorant may be a dispersion of dyed melamine-toluenesulfonamide-formaldehyde polymer in a mixture of alkyl based resins and aliphatic hydrocarbons. The colorant may be about 2 to 30 parts by weight of the composition.

32 Claims, No Drawings

UV-SENSITIVE MARKING COMPOSITION

FIELD OF THE INVENTION

The present invention relates to a UV sensitive marking composition, and more particularly to a marking composition that progressively fades under exposure to UV light until it is substantially invisible.

BACKGROUND OF THE INVENTION

Surface marking has been widely practiced in the construction and survey industries. For example, highly visible site marks are needed to indicate the location of underground utilities. Surface marking is also used in landscape surveys, traffic marking, athletic field marking, and aisle striping in parking lots.

In certain situations, especially for survey marking or construction site marking, it is desirable to minimize unsightly locator marks in visually sensitive areas after the construction or surveys are completed. Therefore, there is a need for a UV-sensitive marking composition that fades to such an extent that it will not be visually disturbing, after the marking purposes have been accomplished.

Moreover, it has been shown that UV-sensitive marking compositions utilizing UV-sensitive pigments, rather than dyes, demonstrate better contrast between the marking composition and the surface to which it is applied. Additionally, UV-sensitive pigments remain visible for longer than UV-sensitive dyes. This is an important consideration in surveying and construction, where a user may mark a particular site, but then not return to the site for several weeks.

Accordingly, a need exists for a marking composition that utilizes pigments, and the advantages associated therewith, while at the same time being of a temporary nature-such that the marks do not remain after the purpose of the marks has been accomplished.

PRIOR ART

Examples of patents related to various marking compositions, each of which is incorporated by reference for its supporting teachings, are as follows:

U.S. Pat. No. 5,714,090 to Waters et al. discloses a non-formaldehyde thermoset fluorescent pigment which is used to color plastics, particularly flexible vinyl, and which is solvent resistant, particularly to acetone. Moreover, the pigment does not bleed in plastics. The pigment comprises a polymer matrix and a fluorescent dye. The polymer matrix has a molecular weight of greater than about 330, preferably greater than about 1000. Embodiments which lack the water insoluble resin, have a molecular weight greater than about 330, preferably greater than about 500. The polymer matrix contains: from about 15 to 50 mole percent, preferably 30 to 40 mole percent, of a carboxylate functional oligomer; 30 to 80 mole percent, preferably 50 to 60 mole percent, of a metal ion; and 0 to 40 mole percent, preferably about 1 to 40 mole percent, more preferably from 1 to 30 mole percent, most preferably from about 3 to 10 mole percent of a water insoluble resin. In embodiments where no water insoluble resin is used, the metal is present from at least 51 mole percent. The oligomer comprises from about 10 to about 60 mole percent, preferably 20 to 35 mole percent of a first monomer, 40 to 90 mole percent, preferably 65 to 80 mole percent of second monomer. The weight average molecular weight of the oligomer is 330 to 2000, preferably about 560 to 600. The invention also relates to a novel method for producing the fluorescent pigments.

U.S. Pat. No. 6,103,006 to DiPietro discloses thermoplastic, non-water soluble, fluorescent pigments having improved lightfastness and which are suitable for coloring a variety of materials including plastics, particularly polyolefins, as well as paints, inks and textiles. The pigments, referred to herein as the "light fast pigments", demonstrate good color, migration resistance, heat stability, water insolubility, friability and resistance to plateout. The light fast pigments have several embodiments, the polyamide embodiment, polyamide ester embodiment and the polyester embodiment. The pigments comprise a polymer which comprises polymerized units of fluorescent dye and polymerized monomers such as for example dicarboxylicacids, polycarboxylicacids, diamines, polyamines, alkanolamines, carboxyalcohols, carboxyamines and difunctional alcohols, and/or polyhydric alcohols. The polyamide pigment embodiment and polyamide-ester pigment embodiment are polymers which comprise polyamide linkages. The polyester pigment embodiment are polymers that comprise polyester linkages, but substantially lacks polyamide linkages. The light fast pigments contain a fluorescent dye reacted into, and covalently bound to the polymer backbone; this distinguishes the light fast pigment from conventional pigments which typically exist as a solid state solution of fluorescent dye and polymer carrier. In the polyester pigment embodiment, the fluorescent dye, which is physically incorporated into the backbone of polymer chain, is the BXDA fluorescent dye or an analog thereof. In the polyamide pigment and polyamide-ester pigment embodiments, the fluorescent dye is the BXDA fluorescent dye or its analogs thereof, or certain conventional dyes. While the light fast pigment demonstrates improved lightfastness, the addition of an optional light stabilizer enhances the lightfastness of the pigment. The invention also relates to a method of making such light fast pigment.

U.S. Pat. No. 5,548,010 to Franer discloses a color additive, which when added to paints, whether water-based or oil-based, varnishes, sealers, lacquers, and other protective or decorative compositions, and to additives therefor, and when applied on a surface provides for a color that dissipates within a reasonable time frame, generally from hours to a few days leaving the paint the original color. The color additives temporarily impart color to paint, the color dissipating over a short period of time substantially to the color of the original composition prior to the addition of the colorant thereto, whether they are water white, tinted or pigmented. A method of temporarily imparting a fugitive color to paint is also disclosed.

None of the foregoing prior art references address the need for a marking composition that utilizes UV-sensitive pigments, and the advantages associated therewith, while at the same time being of a temporary nature—such that the marks do not remain after the purpose of the marks has been accomplished.

SUMMARY OF THE INVENTION

A marking composition for placing a temporarily visible mark on a surface is therefore provided. The marking composition of the present invention includes a paint base and a pigmented colorant. The colorant is dispersed within the paint base, and has characteristics that cause the mark to progressively become substantially invisible upon exposure to UV light. In one embodiment, UV absorbers and/or anti-oxidants are added. These additives effect the rate at which the mark becomes invisible.

The pigmented colorant may be a dispersion of dyed melamine-toluenesulfonamide-formaldehyde polymer in a mixture of alkyl based resins and aliphatic hydrocarbons. The colorant can be about 2–30 parts by weight of the marking composition. A variety of colors may be selected for the pigmented colorant. For example, the colorant may have a color selected from the group consisting of red, orange, yellow, pink, blue and green. More particularly, the colorant may be a Special Fugitive Colorant, which is a dispersion of a dyed melamine-toluenesulfonamide-formaldehyde polymer in a mixture of alkyd based resins and aliphatic hydrocarbons, made by and commercially available from Day-Glo Color Corporation of Cleveland, Ohio. Examples of suitable Special Fugitive Colorants include: Special Fugitive Yellow Dispersion, No. 121M6669; Special Fugitive Orange Dispersion, No. 121M6665; Special Fugitive Red Dispersion, No. 121M6850; Special Fugitive Red Dispersion; No. MT6633; Special Fugitive Pink Dispersion, No. 121M6832; Special Fugitive Green Dispersion No. 121M6853.

In one embodiment, the paint base comprises a binder, a solvent and paint additives. The binder may be about 8 to 45 parts, the solvent may be about 10 to 60 parts and the paint additives may be about 1 to 15 parts, by weight of the marking composition. Examples of binders include, but are not limited to, alkyds, vinyls, soluble cellulosics, urethanes, epoxies, modified and unmodified phenolics, acrylics, polystyrenes, alkyls, silicones, terpenes, and any other known binder. Examples of solvents include, but are not limited to, benzene, toluene, xylene, ethylene dichloride, ethyl acetate, acetone, methyl ethyl ketone, methyl isobutyl ketone, propylene oxide, naphtha, isopropyl alcohol, water, hexanes and ethylene glycol monobutyl ether. Examples of additives that may be present in the marking composition include, but are not limited to, plasticizers, preservatives and surfactants.

A method of temporarily marking a surface is also disclosed. This method includes the step of applying a marking composition having a paint base and a pigmented colorant, dispersed within the paint base, having UV-sensitive fading characteristics. Once the marking composition is applied, it is exposed to UV light, such that the mark fades progressively to an extent that it is substantially invisible.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying examples and claims, or may be learned by the practice of the invention.

DETAILED DESCRIPTION OF THE PREFERRED EMBODIMENT(S)

The present invention relates to a UV-sensitive marking composition, and more particularly to a marking composition that progressively fades under exposure to UV light until it is substantially invisible. The composition includes a paint base and a UV-sensitive pigmented colorant. The fact that the UV-sensitive colorant is pigment-based is an important feature of the present invention. Pigments, and particularly flourescent pigments, allow for better visibility on a given surface. This is particularly true for darker surfaces such as asphalt. Furthermore, UV-sensitive pigments do not break down (i.e. progressively become invisible under exposure to UV light) as quickly as UV-sensitive dyes. This is an important consideration because it allows the user to place a mark on a selected surface, then leave the mark for up to several weeks. Upon returning, the mark will still be visible. Thus, the present invention provides a marking composition that remains visible long enough to accomplish the purposes for which the mark was initially placed, but does not leave a permanent, unsightly blemish on the surface being marked.

In one embodiment, the pigmented colorant is a dispersion of dyed melaminetoluenesulfonamide-formaldehyde polymer in a mixture of alkyl based resins and aliphatic hydrocarbons. The pigmented colorant may be about 2 to about 30 parts by weight of the marking composition, and can be any number of colors. Preferably, the pigmented colorant is a Special Fugitive Colorant, which is a dispersion of a dyed melamine-toluenesulfonamide-formaldehyde polymer in a mixture of alkyd based resins and aliphatic hydrocarbons, made by and commercially available from Day-Glo Color Corporation of Cleveland, Ohio. Examples of suitable Special Fugitive Colorants include: Special Fugitive Yellow Dispersion, No. 121M6669; Special Fugitive Orange Dispersion, No. 121M6665; Special Fugitive Red Dispersion, No. 121M6850; Special Fugitive Red Dispersion; No. MT6633; Special Fugitive Pink Dispersion, No. 121M6832; Special Fugitive Green Dispersion No. 121M6853. However, it is noted that many other colors can be incorporated into the present pigmented colorant.

The paint base of the marking composition may include any suitable binders, solvents and additives. In one embodiment, the binder is about 8 to 45 parts, the solvent is about 10 to 60 parts and the additives are about 1 to 15 parts, by weight of the marking composition. The colorant dispersion can be mixed with the paint base composition at time of manufacture of the marking composition, or be dispensed into the paint base at time of use.

Examples of suitable binders include, but are not limited to, alkyds, vinyls, soluble cellulosics, urethanes, epoxies, modified and unmodified phenolics, acrylics, polystyrenes, alkyls, silicones, terpenes, and any other known binder. Examples of suitable solvents known in the art include, but are not limited to, benzene, toluene, xylene, ethylene dichloride, ethyl acetate, acetone, methyl ethyl ketone, methyl isobutyl ketone, propylene oxide, naphtha, isopropyl alcohol, water, hexanes, ethylene glycol monobutyl ether and mixtures thereof.

The marking composition may also include a propellant. In one embodiment, the propellant agent is from about 15 to 40 parts by weight of the marking composition. Examples of propellant agents include, but are not limited to, propane, isobutane, n-butane, dimethyl ether, and blends thereof Other optional additives include plasticizers (e.g. dibutylphthalate and related compounds), preservatives and surfactants.

As noted above, an advantage of using a pigmented colorant in the present marking composition, as opposed to using a dye, is the longevity of the mark before becoming invisible. Pigmented colorants remain visible longer than dyes of similar concentration. Typically, once applied, the mark will remain visible for at least four days. If desired, the composition may also be formulated such that the mark remains visible for up to forty (40) days or longer. This is advantageous because it allows a user to place a mark in a given area, but then have several weeks before the mark becomes substantially invisible under exposure to UV light. Furthermore, because relatively lower concentrations of pigments are required to obtain a longer lasting mark, the use of UV-sensitive pigments is also advantageous in terms of expense.

The paint base portion of the marking composition may also include additives regulating the fading rate of the pigmented colorant. Two important additives that effect the amount of time the mark is visible are UV absorbers and anti-oxidants. As noted above, an important consideration in a marking composition is the amount of time the mark is visible. Under certain circumstances, is it desirable to have the mark visible for several weeks before becoming substantially invisible. UV absorbers and anti-oxidants absorb UV radiation that would otherwise be bombarding the UV-sensitive colorant. Because less UV radiation is bombarding the colorant, the colorant will not degrade as quickly. Thus, the colorant will remain visible for a longer period of time before fading to substantial invisibility.

Examples of UV light absorbers include hindered amines and benzotriazole based UV-absorbers (sold under the Tinuvin® brand name available from CIBA Specialty Chemical Corporation, Basel, Switzerland) and can be added in amounts of 0.1% to 10% by weight of the composition. Examples of anti-oxidants include hindered phenolics such as Irganox® (available from CIBA Specialty Chemical Corporation, Basel, Switzerland) and can be added in amounts of 0.1% to 10% by weight of the composition.

It is also noted that different pigmented colorants, having varying light sensitivity, may be used. In other words, specific UV-sensitive pigments can be selected that will degrade to invisibility more quickly than others. Other factors that may effect the amount of time the mark is visible include: the concentration of the pigment, the thickness of the coating, the nature of the binder and other constituents, the incident light, the amount of exposure to sunlight and/or traffic, drying time, etc.

Consideration is therefore required with the embodiment to equate the constituents and the amounts best suited to the amount of time desired for the mark to remain visible—i.e. whether it is desired that the mark disappears in a few days or several weeks. Also relevant to the formulation of a particular composition is the reaction of the composition to other constituents with regard to stability, pH factors, solubility, length of a marking-life, storage expectations and performance of the marking composition during application.

The marking compositions of the present invention may also include conventional paint additives such as dryers, dispersing agents, stabilizers, anti-settling agents, anti-skinning agents, flow agents, bubble breakers and similar materials as long as they do not adversely effect the UV-sensitive characteristics of the composition.

The marking composition of the present invention provides the best contrast on darker surfaces such as asphalt, grass and soil. However, the composition may likewise be used in connection with wood, concrete, glass, gravel, steel or any number of surfaces in need of marking.

The following examples of formulations of the marking composition according to the present invention are provided to illustrate the principles of the present invention and should not be considered to limit the invention. Numerous other variations are possible that are within the scope of the invention as claimed.

EXAMPLE 1

A marking composition was prepared as follows (all parts are by weight): In a suitable container, 44 parts of xylene were added followed by 25 parts of acrylic resin. These components were mixed until completely dissolved. Twenty (20) parts Special Fugitive a Colorant were then added. One (1) part TINUVIN® P (a benzotriazole based UV-absorber available from CIBA Specialty Chemical Corporation, Basel, Switzerland) was then added, and the composition was mixed until homogeneous. Next, 1 part acetone and 9 parts xylene were added, and the composition was again mixed until homogeneous. This formulation exhibited a dry time of 15 minutes or less. It is also noted that after 15 days had passed, the color of the mark disappeared significantly, and was almost completely invisible by day 40.

EXAMPLE 2

In a suitable container, 219 parts of the marking composition described in EXAMPLE 1 were further mixed with 85 parts acetone and 128 parts hydrocarbon propellant (the propellant consists of 58% propane, 15% isobutane, and 27% n-butane by weight). This formulation exhibited a dry time of 15 minutes or less. After 15 days, the color of the mark disappeared significantly, and was almost completely invisible by day 40.

EXAMPLE 3

In a suitable container, 30 parts vinyl toluene alkyd resin were mixed with 32 parts xylene. Then 1.5 parts M-P-A 4020X (anti-settling agent from Elementus Specialties, Hightstown, N.J.), 0.3 parts zirconium carboxylate drier, 0.1 parts cobalt carboxylate drier, 0.15 parts methyl ethyl ketoxime (anti-skinning agent) and 0.15 parts methylalkylpolysiloxane (defoamer) were added and mixed at high speed. Once the composition reached at least 100 F, 20 parts Special Fugitive Colorant and 1 part TINUVIN® P were added and thoroughly mixed. Next, 10 parts xylene and 5 parts acetone were added. This formulation exhibited a practical dry time of 15 minutes or less. After 10 days had passed, the color has significantly disappeared, and was almost completely invisible by day 30.

EXAMPLE 4

In suitable container, 112 parts acetone and 100 parts hydrocarbon propellant were added to 135 parts of the formulation of EXAMPLE 3. This formulation exhibited a practical dry time of 15 minutes or less. After 10 days had passed, the color has significantly disappeared, and was almost completely invisible by day 30.

EXAMPLE 5

In a suitable container, 20 parts water soluble acrylic modified resin (such as MACOPOL®_WR214-3100 from McWhorter Technologies, Carpentersville, Ill.), were mixed together with 13 parts ethylene glycol monobutyl ether, 0.15 parts zirconium carboxylate drier, 0.07 parts cobalt carboxylate drier, 1.5 parts morpholine, and 22 parts water. After mixing at high speed for 5–20 minutes, 2.5 parts RHEOLATE® 2001 (a thickener from Rheox, Inc., Hightstown, N.J.) and 1.5 parts TINUVIN® P were then added and mixed at high speed for 20 minutes. Next, 20 parts Special Fugitive Colorant were added. The composition was mixed until homogeneous, then while mixing, 10 parts hexanes were added. This formulation exhibited dry time of 20 minutes or less, and after 10 days the color disappeared significantly and was almost completely invisible by day 30.

EXAMPLE 6

In a suitable container, 50 parts water and 160 parts dimethyl ether propellant were mixed with 279 parts of the formulation described in EXAMPLE 5. This exhibited dry time of 20 minutes or less, and after 10 days the color disappeared significantly and was almost completely invisible by day 30.

The embodiments of present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A composition for placing a temporarily visible mark on a surface, comprising:
   a) a paint base; and
   b) a pigmented colorant, dispersed within the paint base, having characteristics that cause the mark to progressively become substantially invisible upon exposure to UV light, wherein the pigmented colorant is a dispersion of dyed melamine-toluenesulfonamide-formaldehyde polymer in a mixture of alkyl based resins and aliphatic hydrocarbons.

2. The composition of claim 1, wherein the pigmented colorant is about 2 to about 30 parts by weight of the composition.

3. The composition of claim 1, wherein the pigmented colorant has a color selected from the group consisting of red, orange, yellow, pink, blue and green.

4. The composition of claim 1, wherein the paint base composition comprises a binder, a solvent and at least one paint additive.

5. The composition of claim 4, wherein the binder is about 8 to 45 parts, the solvent is about 10 to 60 parts and the at least one additive is about 1 to 15 parts, by weight of the composition.

6. The composition of claim 4, wherein the binder is at least one member selected from the group consisting of alkyds, vinyls, soluble cellulosics, urethanes, epoxies, modified and unmodified phenolics, acrylics, polystyrenes, alkyls, silicones and terpenes.

7. The composition of claim 4, wherein the solvent is at least one member selected from the group consisting of benzene, toluene, xylene, ethylene dichloride, ethyl acetate, acetone, methyl ethyl ketone, methyl isobutyl ketone, propylene oxide, naphtha, isopropyl alcohol, water, hexanes and ethylene glycol monobutyl ether.

8. The composition of claim 1, further comprising from 15 to about 40 parts by weight of the composition a propellant.

9. The composition of claim 1, wherein the mark remains visible for up to forty (40) days.

10. The composition of claim 1, wherein the mark remains visible for at least four (4) days.

11. The composition of claim 1, further comprising at least one additive from the group consisting of preservatives, plasticizers and surfactants.

12. The composition of claim 1, wherein the surface to be marked is a member selected from the group consisting of asphalt, concrete, grass and soil.

13. A method of temporarily marking a surface, comprising the steps of:
   a) applying a marking composition having:
      i) a paint base: and
      ii) a pigmented colorant, dispersed within the paint base, having UV-sensitive fading characteristics, wherein the pigmented colorant is a dispersion of dyed melamine-toluenesulfonamide-formaldehyde polymer in a mixture of alkyl based resins and aliphatic hydrocarbons; and
   b) exposing the marking composition to UV light, such that the mark fades progressively to an extent that it is substantially invisible.

14. The method of claim 13, wherein the pigmented colorant is about 2 to about 30 parts by weight of the marking composition.

15. The method of claim 13, wherein the pigmented colorant has a color selected from the group consisting of red, orange, yellow, pink, blue and green.

16. The method of claim 13, wherein the paint base comprises a binder, a solvent and at least one paint additive.

17. The method of claim 16, wherein the binder is about 8 to 45 parts, the solvent is about 10 to 60 parts and the at least one additive is about 1 to 15 parts, by weight, of the marking composition.

18. The method of claim 16, wherein the binder is at least one member selected from the group consisting of alkyds, vinyls, soluble cellulosics, urethanes, epoxies, modified and unmodified phenolics, acrylics, polystyrenes, alkyls, silicones and terpenes.

19. The method of claim 16, wherein the solvent is at least one member selected from the group consisting of benzene, toluene, xylene, ethylene dichloride, ethyl acetate, acetone, methyl ethyl ketone, methyl isobutyl ketone, propylene oxide, naphtha, isopropyl alcohol, water, hexanes and ethylene glycol monobutyl ether.

20. The method of claim 13, wherein the marking composition further comprises from 24 to about 34 parts by weight of the marking composition a propellant.

21. The method of claim 13, wherein the marking composition further comprises at least one additive selected from the group consisting of: preservatives, surfactants and plasticizers.

22. The method of claim 13, wherein the surface to be marked is a member selected from the group consisting of asphalt, concrete, grass and soil.

23. The composition of claim 1, further comprising at least one additive selected from the group consisting of UV absorbers and anti-oxidants.

24. The composition of claim 23, wherein the UV absorber is at least one member selected from the group consisting of: hindered amines and benzotriazole based UV-absorbers.

25. The composition of claim 23, wherein the UV absorber is present in a concentration of about 0.1% to 10% by weight of the composition.

26. The composition of claim 23, Therein the anti-oxidant is a hindered phenolic.

27. The composition of claim 23, wherein the anti-oxidant is present in a concentration of about 0.1% to 10% by weight of the composition.

28. The method of claim 13, wherein the marking composition further comprises at least one additive selected from the group consisting of UV absorbers and anti-oxidants.

29. The method of claim 28, wherein the UV absorber is selected from the group consisting of hindered amines and benzotriazole based UV-absorbers.

30. The method of claim 28, wherein the UV absorber is present in a concentration of about 0.1% to 10% by weight of the composition.

31. The method of claim 28, wherein the anti-oxidant is a hindered phenolic.

32. The method of claim 28, wherein the anti-oxidant is present in a concentration of about 0.1% to 10% by weight of the composition.

* * * * *